United States Patent
> Urban

[15] 3,649,183
[45] Mar. 14, 1972

[54] TREATMENT OF THIOSULFATE-CONTAINING AQUEOUS SOLUTIONS WITH CARBON MONOXIDE

[72] Inventor: Peter Urban, Northbrook, Ill.
[73] Assignee: Universal Oil Products Company, Des Plaines, Ill.
[22] Filed: Dec. 17, 1969
[21] Appl. No.: 886,036

[52] U.S. Cl. ................................... 23/137, 23/134, 23/181
[51] Int. Cl. ............... C01b 17/16, C01b 17/20, C01b 17/28
[58] Field of Search ........................... 23/134, 181, 137

[56] References Cited

UNITED STATES PATENTS

| | | | |
|---|---|---|---|
| 3,558,272 | 1/1971 | Urban | 23/137 |
| 1,636,106 | 7/1927 | Naef | 23/137 |
| 3,401,010 | 9/1968 | Guerrieri | 23/181 X |

OTHER PUBLICATIONS

" Encyclopedia of Chemical Reactions," by C. A. Jacobson et al., Vol. 7, 1958, page 146, Reinhold Publishing Corp., New York.

Industrial and Engineering Chemistry, Feb. 1936, pages 244–246.

*Primary Examiner*—Edward Stern
*Attorney*—James R. Hoatson, Jr. and Thomas K. McBride

[57] ABSTRACT

A water-soluble thiosulfate compound is reduced by contacting an aqueous solution of the thiosulfate compound with carbon monoxide at reduction conditions including a temperature of about 125° to about 350° C. and a pressure sufficient to maintain at least a part of the solution in the liquid phase. The principal utility of this treatment procedure is associated with the regeneration of aqueous streams produced in a process for scrubbing sulfur dioxide from a flue gas. Key features of this method are its high activity for converting thiosulfate and its high selectivity for sulfide with attendant minimization of undesired sulfate byproducts.

15 Claims, No Drawings

TREATMENT OF THIOSULFATE-CONTAINING AQUEOUS SOLUTIONS WITH CARBON MONOXIDE

The subject of the present invention is a method for the conversion of a water-soluble thiosulfate compound to a lower oxidation state—primarily to the corresponding sulfide compound and hydrogen sulfide. Illustrative of this method is the conversion of ammonium thiosulfate to ammonium sulfide and hydrogen sulfide. More specifically, the present invention relates to a novel reduction method which utilizes controlled amounts of carbon monoxide in conjunction with conditions selected to maintain a liquid phase condition to effect, in a highly selective manner, a decrease in the oxidation state of a water-soluble thiosulfate compound without producing any substantial amounts of undesired sulfate compounds. In one important aspect, it involves a method for the production of ammonium hydrosulfide and hydrogen sulfide from an aqueous solution containing ammonium thiosulfate. In another important aspect, it encompasses treatment of a water stream containing a thiosulfate compound, which generally is a stream produced during the course of process for scrubbing of a flue gas stream containing $SO_2$, in order to lower the total sulfur content thereof and to allow the resulting treated stream to be reused in the process which produced the input water stream or to be discharged into any convenient sewer without causing a pollution problem.

As part of the price that has to be paid for a modern industrial society, large quantities of aqueous solutions of thiosulfate compounds are currently produced in a number of industrial processes. In particular, aqueous solutions containing ammonium thiosulfate are an undesired side product of many economically significant industrial processes in the chemical, paper, petroleum and steel industries. For instance, in the petroleum industry, an aqueous solution containing ammonium thiosulfate is produced as a drag stream from sulfur recovery systems that employ an oxidation method to recover sulfur from ammonium hydrosulfide solutions which are available as side streams from such typical refinery processes as hydrorefining, hydrocracking, catalytic cracking, etc. Another source of these thiosulfate containing streams are processes for natural gas sweetening, coal gas purification, town gas purification, and the like processes wherein hydrogen sulfide is scrubbed from a gaseous mixture containing the same, and thereafter oxidized to elemental sulfur in a regeneration step. In these latter types of processes, an inevitable side reaction appears to be one leading to the formation of a thiosulfate salt which can then accumulate in the absorption solution. The net amount of the thiosulfate being produced must then be continuously or periodically purged from the system by discarding a drag stream. For example, in the Ferrox process for natural gas sweetening or for coal gas purification, where iron oxides suspended in an alkaline, aqueous solution are used to extract $H_2S$ with regeneration of the rich solution by air oxidation, formation of a thiosulfate salt is observed as a side product in the regeneration step, and a drag stream containing this salt must be periodically discarded. Another example is in the Thylox process which is typically utilized for coke-oven gas treating and which employs a treating solution comprising arsenic trioxide and sodium carbonate dissolved in water with regeneration of the rich solution by air oxidation in a separate oxidizing zone. Once again a drag stream containing thiosulfate salts and water soluble thiocyanate salts is removed from this process in order to purge the net make of thiosulfate, and this stream results in a requirement for continuous replacement of sodium carbonate and arsenic trioxide. Yet another example is the Perox process which utilizes an aqueous ammonium solution containing an organic oxidation catalyst and which regenerates the rich solution by oxidation with air with consequential thiosulfate formation and requirement for thiosulfate-containing drag stream. Regardless of the source of the aqueous stream containing the thiosulfate compound, it is clear that there is a substantial need for a method of treating the thiosulfate solution in order to remove the thiosulfate compound and allow either the reuse of the resulting treated aqueous stream or the safe discharge of the resulting stream in sewers and/or rivers and streams. The first alternative is particularly advantageous when thiosulfate-containing stream also contains other valuable reagents such as in the Thylox process previously mentioned wherein the drag stream also contains sodium carbonate and arsenic trioxide. In addition, the growing sensitivity of the public to the adverse effects of indiscriminate discharge of waste stream by the chemical and petroleum industry provides an additional incentive for treating these thiosulfate-containing streams prior to their discharge into sewer systems.

In a case of particular interest, hydrorefining or hydrocracking of petroleum distillates containing nitrogenous and sulfurous contaminants, large quantities of ammonium and hydrogen sulfide are present in the effluent from the reaction zone, and these contaminants are generally absorbed in an aqueous solution which is injected into the effluent train of condensers and separating zones associated with the process. This results in an aqueous waste stream typically containing ammonium hydrosulfide ($NH_4HS$) which can thereafter be subjected to an oxidizing step in order to recover sulfur therefrom or to reduce the biological oxygen demand thereof. Despite stringent precautions, a minor amount of thiosulfate salt (i.e., $(NH_4)_2 S_2O_3$) is inevitably formed as a side product in this oxidation step. The resulting ammonium thiosulfate containing aqueous solution withdrawn as effluent from this oxidation step cannot be reused to recover an additional portion of ammonium hydrosulfide because if it is injected into the effluent train associated with the hydrorefining or hydrocracking process the hydrogen sulfide and/or ammonium hydrosulfide present in this effluent can react with the ammonium thiosulfate to produce free sulfur which can contaminate the hydrocarbon product from this process leading to severe corrosion problems in downstream equipment. Accordingly, there is a substantial need for a method of treating an aqueous solution containing a thiosulfate compound in order to allow reuse of the aqueous stream within the process which produced it.

In another case of particular interest, scrubbing of sulfur dioxide from flue gas streams, large quantities of thiosulfate compounds are typically present in one or more of the liquid streams circulated between the various steps of the process. For example, when a basic solution such as ammonium hydroxide or ammonium carbonate is used to scrub the flue gas steam, the liquid stream withdrawn from the scrubbing step will contain ammonium sulfite. As is well known to those skilled in the art, many of the methods proposed for regenerating this sulfide-containing liquid stream involve the production of ammonium thiosulfate during some step of the regeneration procedure. In particular, I have recently discovered a regeneration procedure which includes, as one of its essential steps, the conversion of the sulfite product from the scrubbing step to the corresponding thiosulfate compound. Regardless of the details associated with the processes that have been proposed for scrubbing flue gas streams, it is clear that many of these produce aqueous streams containing thiosulfate compounds and it is precisely these streams which are suitable input streams for the method of the present invention.

Quite understandably, in recent years attention has been focused upon a search for methods of converting the thiosulfate compound contained in these aqueous streams into products that can be easily separated from the aqueous stream, thereby allowing a reuse of the aqueous stream in the process from which it came, or its discharge into any suitable available sink such as rivers, lakes, streams, ponds, etc.

I have now found a method for reducing these water-soluble thiosulfate compounds in a highly selective manner, primarily into the corresponding sulfide compound and hydrogen sulfide which products can be easily removed from the treated water stream by a suitable, conventional stripping step as disclosed herein, or in many cases, can be left in the treated stream as they do not adversely effect the properties of the treated aqueous stream when it is reused in the process from which it originated. In other words, the sulfide products of the present method can in many cases remain in the treated aqueous stream when it is recycled to absorb additional quantities of sulfur dioxide or hydrogen sulfide. In essence, my invention involves recognition that carbon monoxide provides an effective and convenient reduction agent for treatment of aqueous streams containing thiosulfate compounds, provided that the reduction operation is conducted under a liquid phase condition. Principal advantages associated with my method are the capability to perform quite satisfactorily at a relatively low temperature and an unusually high selectivity for sulfide, with attendant minimization of undesired sulfate byproducts. The central point associated with my method involves the maintenance of a liquid phase during the reduction step.

It is, accordingly, one object of my invention to provide a method for reducing water-soluble thiosulfate compounds in a convenient and efficient manner without producing any substantial amounts of undesired sulfate compounds. Another object is to provide a method for accomplishing this reduction at relatively low temperatures. Yet another object is to provide a method for purifying thiosulfate-containing waste streams so that they may be reused if desired or discarded without causing substantial pollution problems.

In a broad embodiment, my invention is a method for reducing a water-soluble thiosulfate compound which comprises contacting an aqueous solution of said thiosulfate compound with carbon monoxide at reduction conditions including a temperature of about 125° to about 350° C. and a pressure sufficient to maintain at least a part of the water contained in the solution in the liquid phase.

Another embodiment of the present instant invention involves a method for reducing ammonium thiosulfate to ammonium hydrosulfide and hydrogen sulfide which comprises contacting an aqueous solution of ammonium thiosulfate with at least 4 moles of carbon monoxide per mole of thiosulfate at reduction conditions including a temperature of about 175° to about 350° C. and a pressure selected from the range of about 200 to about 3,000 p.s.i.g. to maintain at least a part of the water in the liquid phase.

In yet another aspect, the present invention relates to the methods described above wherein the contacting of the aqueous solution and the carbon monoxide is conducted in the presence of a catalyst comprising a combination of a metallic component selected from the group consisting of the transition metals of Group VI and VIII combined with a suitable high surface area, porous carrier material—for example, a particularly useful catalyst comprises cobalt sulfide combined with an activated carbon carrier material.

Other objects and embodiments of the present invention include specific details about particular thiosulfate compounds which can be treated thereby, preferred reaction conditions for the method, preferred catalyst for use therein, and particularly beneficial flow schemes for use therewith. These are all hereinafter disclosed in the following discussion of each of these facets of the present invention.

One reactant for the method of the present invention is a water-soluble thiosulfate compound. Typical examples of suitable water-soluble thiosulfate compounds are ammonium thiosulfate, the alkali metal thiosulfates and the alkaline earth thiosulfates. Typical alkali metal thiosulfates are sodium and potassium thiosulfate. Similarly, suitable alkaline earth thiosulfates are calcium thiosulfates and magnesium thiosulfates. Best results are ordinarily obtained with the method of the present invention when the thiosulfate compound is ammonium thiosulfate. As indicated above, it is an essential feature of the present invention that the thiosulfate compound is charged thereto in an aqueous solution. The amount of thiosulfate compound contained in this solution can range from relatively small amounts up to the solubility limit of the particular salt in water at the conditions utilized in the instant reduction method. Typically, the amount of thiosulfate will be sufficient to constitute about 0.1 to about 25 wt. percent of the solution, calculated on a thiosulfate compound basis. For example, excellent results have been obtained with an aqueous solution containing 20.8 wt. percent ammonium thiosulfate.

The other reactant for the present method is carbon monoxide. The carbon monoxide for use herein may be obtained from any suitable source or may be prepared in any suitable manner. An acceptable carbon monoxide stream is obtained by the partial oxidation of organic materials, and particularly carbon at high temperature with oxygen, air or steam. Likewise, a carbon monoxide stream suitable for use herein can be prepared by the reduction of carbon dioxide by hydrogen, carbon or certain metals at high temperatures. For example, a gas stream containing about 40 percent carbon monoxide is easily prepared by blowing steam through a bed of coal at an elevated temperature. Another suitable stream is obtained by simultaneously blowing air and steam through a bed of red hot coal to produce a gas stream containing about 30 percent carbon monoxide. In addition, blast furnace gases resulting from the reduction of iron oxide by red hot coke can be utilized to supply the necessary carbon monoxide stream if desired. Yet another source of a suitable carbon monoxide stream is a stream prepared by passing carbon dioxide and oxygen through charcoal or coke at a temperature greater than about 1,000° C. in order to decompose the $CO_2$ to CO. Regardless of the source of the carbon monoxide, it is preferably used herein in an amount sufficient to provide a mole ratio of carbon monoxide to thiosulfate compound of at least 4:1, with best results obtained at a mole ratio of about 5:1 to 10:1 or more. I have observed that the amount of sulfide formed increases with higher mole ratios of carbon monoxide to thiosulfate.

As indicated above, the method of the present invention can be carried out without the use of a catalyst; however, in many cases it is advantageous to use a catalyst for this reaction. Based on my investigations, I have determined that improved results are obtained when the reaction zone contains materials such as glass beads, particles of charcoal, and particles of activated carbons. Particularly good results are obtained with a catalyst comprising a metallic component selected from the group consisting of the transition metals of Group VI and VIII such as chromium, molybdenum, tungsten, iron, cobalt, nickel, platinum, palladium, etc. From this, I have concluded that preferred catalysts for the desired reduction reaction comprise a combination of a Group VI or a Group VIII transition metal component with a porous support such as alumina or activated carbon. Particularly preferred embodiments of the present method involve the use of catalysts in which the metallic component is present in the form of a metallic sulfide such as cobalt sulfide, or molybdenum sulfide, or tungsten sulfide combined with a carrier material. The preferred carrier materials are activated carbons such as those commercially available under the trade name of Norite, Nuchar, Darco and other similar products. In addition, other conventional natural or synthetic highly porous inorganic carrier materials may be used as the support for the metallic component such as alumina, silica, silica-alumina, etc. Best results are ordinarily obtained with a catalyst comprising cobalt sulfide combined with relatively small particles of activated carbon. As reported in the examples, excellent results were obtained with 10 to 12 mesh activated carbon particles containing about 5 wt. percent of cobalt sulfide. In general, the amount of the metallic component utilized in the catalyst should be sufficient to comprise about 0.1 to about 50 percent thereof, calculated on a metallic sulfide basis. These metallic catalysts can be prepared according to any of the conventional procedures for combining a metallic component with a carrier material, with an impregnation procedure with a soluble, decomposable compound of the desired Group VI or VIII metal ordinarily giving best results.

The instant reduction method can be carried out in any suitable manner and in either a batch or a continuous type system. In a batch system, the aqueous solution containing the thiosulfate compound is charged to a reaction zone which is, thereafter, charged with carbon monoxide to the desired pressure level. In the case where a catalyst is utilized in a batch type operation, it is mixed with the reactants in the reaction zone and agitation is supplied to the zone in order to insure intimate contact between the reactants and the catalyst. Even if a catalyst is not utilized in the batch embodiment, it is preferred to vigorously agitate the contents of the reaction zone in order to insure intimate contact between the gas and the liquid phases present therein. In a continuous type system, the thiosulfate-containing aqueous stream is passed into the reaction zone—either in an upward, radial or downward flow with a carbon monoxide stream being simultaneously introduced into the zone in either countercurrent or concurrent flow relative to the thiosulfate stream. In particular, a preferred embodiment involves downflow flow of the thiosulfate stream with countercurrent flow of the carbon monoxide stream. In this continuous system, it is preferred to utilize suitable means in the reaction zone for effecting intimate contact between the liquid stream and the gas stream. Suitable contacting means involve bubble trays, baffles or any of the various packing materials know to those skilled in the art. In the case where a catalyst is utilized in a continuous type system, it is preferably maintained within the reaction zone as a fixed bed of relatively small particles which perform the dual functions of catalyzing the desired reaction and of effecting contact between the gas and liquid streams.

As indicated above, a preferred embodiment of the present method involves a continuous system with a countercurrent operation wherein the aqueous stream is passed downflow into the reaction zone containing suitable contacting means. The carbon monoxide stream is then passed through the zone in an upflow manner. This countercurrent operation produces an overhead stream containing hydrogen sulfide, carbon dioxide and unreacted carbon monoxide and a bottom aqueous stream which is substantially free of both thiosulfate and sulfide compounds. Thus, the principal advantage associated with this mode of operation is it enables two functions to be performed in the reaction zone: the reduction of the thiosulfate compound and the simultaneous stripping of the sulfide product from the treated effluent stream. In other embodiments, where a portion of the sulfide product of the reaction remains in the liquid stream withdrawn from the reaction zone, it can be easily removed therefrom by a conventional stripping step or it can be converted to elemental sulfur by a suitable oxidation procedure.

The reaction conditions utilized in the present method can be generally characterized as reduction conditions sufficient to effect conversion of thiosulfate to sulfide. The temperature is preferably selected from the range of about 125 to about 350° C., with best results obtained at a relatively high temperature of about 175° to about 350° C. As indicated hereinbefore, it is an essential feature of the present invention that the reaction be conducted under liquid phase conditions, and accordingly the pressure employed must be sufficient to maintain at least a portion of the solution in the liquid phase. Typically, the pressure is selected from the range of about 100 to about 3,000 p.s.i.g. as a function of the reaction temperature in order to maintain the desired liquid phase. As reported in the Examples, particularly good results are obtained at a temperature of 200° C and a pressure of 500 p.s.i.g.

In a batch embodiment of the present invention, the contact time utilized is preferably about one-half to about 5 hours, with best results obtained at 0.75 to about 2.5 hours. In a continuous process, it is preferred to use a liquid hourly space velocity (defined on the basis of the volume charge rate of the thiosulfate solution divided by the volume of the reaction zone in the case where a catalyst is not utilized, and by the volume of the catalyst bed in the case where a catalyst is utilized) in the range of from about 0.25 to 10 hrs.$^{-1}$, with best results obtained at about 0.5 to about 3 hours$^{-1}$.

The following examples are given to illustrate further the novelty, preferred modes of operation and utility of the present invention. These examples are intended to be illustrative rather than restrictive.

EXAMPLE I

An 850 cc. reactor was loaded with 250 cc. of an aqueous solution containing 0.08 moles of sodium thiosulfate. Carbon monoxide was then added to the reactor in an amount sufficient to raise the pressure therein to 300 p.s.i.g. The mole ratio of carbon monoxide to sodium thiosulfate used was about 6:1. The reactor was then sealed and the temperature therein increased to and maintained at 200° C. The reactor was then agitated for a period of 1 hour. Thereafter, the products of the reaction were withdrawn from the reactor and analyzed. The results of the analysis showed that 95 mole percent of the sodium thiosulfate was converted to hydrogen sulfide.

EXAMPLE II

A 20.8 wt. percent aqueous solution of ammonium thiosulfate was contacted with a carbon monoxide stream in a reactor containing liquid-gas contacting means. The reactor was operated in a continuous manner in a counterflow mode with the liquid stream flowing therethrough in a downflow fashion and the gas stream in an upflow fashion. The reactor was operated with an 8 hour lineout period followed by an 8 hour test period. During the run, a liquid product stream was continuously withdrawn from the bottom of the reactor and analyzed. Likewise a gas stream was withdrawn from the top of the reactor and analyzed. The contacting means used in the reactor was a packing material comprising 10 to 12 mesh particles of activated carbon. The reaction conditions used were: a temperature of 200° C., a pressure of 500 p.s.i.g., a liquid hourly space velocity based on the volume of the packing material of 1 hr.$^{-1}$, and a carbon monoxide to ammonium thiosulfate mole ratio of 3.7:1. Results obtained during the 8 hour test period were: an ammonium thiosulfate conversion of 96 percent, a selectivity for sulfide of 65 mole percent and a selectivity for ammonium sulfate of less than 2 mole percent. In addition, a minor amount of ammonium polysulfide was obtained. These selectivity numbers are given here and in subsequent examples on the basis of moles of thiosulfate converted.

EXAMPLE III

The experiment reported in Example II was repeated with the amount of CO used increased to a value corresponding to a mole ratio of carbon monoxide to ammonium thiosulfate of 5.46:1. Results obtained were an ammonium thiosulfate conversion of 98 percent with a selectivity for sulfide of 99 mole percent.

This example evidences the high selectivity for sulfide that can be achieved by the method of the present invention.

EXAMPLE IV

The experiment described in Example II was repeated with a packing material consisting of 10 to 12 mesh particles of activated carbon having a cobalt sulfide component combined therewith in an amount of about 5 wt. percent, calculated as cobalt sulfide. The conditions utilized in this experiment were the same as in Example II except that the mole ratio of carbon monoxide to ammonium thiosulfate was 5.46:1. Results here were a conversion of thiosulfate of 99 percent with a selectivity for sulfide of 98 mole percent.

EXAMPLE V

The experiment described in Example II was repeated with a packing material which is 10 to 12 mesh particles of activated carbon having combined therewith a molybdenum sulfide component in an amount of about 5 wt. percent, calculated as molybdenum sulfide. The conditions utilized were essentially the same as in Example II except that the mole ratio of carbon monoxide to thiosulfate was 5.62:1. The results of this experiment were a conversion of thiosulfate of 94 percent and a selectivity for sulfide of about 97 mole percent.

EXAMPLE VI

The experiment described in Example II was once again repeated with a different packing material. The packing material used comprised 10 to 12 mesh particles having combined therewith a tungsten sulfide component in an amount of about 5 wt. percent, calculated as tungsten sulfide. Results obtained here were a conversion of thiosulfate of 99 mole percent and a selectivity for sulfur of 99 mole percent.

It is intended to cover all changes and modifications of the present invention, and particularly the above examples, which would be self-evident to a man of ordinary skill in the water treating art.

I claim as my invention:

1. A method of reducing a water-soluble thiosulfate compound selected from the group consisting of alkali metal, alkaline earth metal and ammonium thiosulfates primarily to the corresponding sulfide compounds and hydrogen sulfide, which method comprises contacting an aqueous solution of said thiosulfate compound with carbon monoxide at a temperature of about 125° to about 350° C. and a pressure of about 100 to about 3000 p.s.i.g. and sufficient to maintain at least a portion of the solution in the liquid phase, said carbon monoxide being present in an amount providing a mole ratio of carbon monoxide to thiosulfate compound of at least 4:1.

2. A method as defined in claim 1 wherein said thiosulfate compound is ammonium thiosulfate.

3. A method as defined in claim 1 wherein said thiosulfate compound is an alkali metal thiosulfate.

4. A method as defined in claim 3 wherein the alkali metal thiosulfate is sodium thiosulfate.

5. A method as defined in claim 1 wherein said thiosulfate compound is an alkaline earth thiosulfate.

6. A method as defined in claim 5 wherein said alkaline earth thiosulfate is calcium thiosulfate.

7. A method as defined in claim 1 wherein said aqueous solution contains about 0.1 to about 25 wt. percent of the thiosulfate compound.

8. A method as defined in claim 1 wherein said reduction conditions include a temperature of about 200° C. and a pressure of about 500 p.s.i.g.

9. A method as defined in claim 1 wherein said contacting is performed in the presence of means for effecting intimate contact between a gas stream and a liquid stream.

10. A method as defined in claim 1 wherein said contacting is performed in the presence of a catalyst comprising activated carbon.

11. A method as defined in claim 1 wherein said contacting is performed in the presence of a catalyst comprising a combination of a metallic component selected from the group consisting of the transition metals of Groups VI and VIII with a porous carrier material.

12. A method as defined in claim 11 wherein said metallic component is cobalt sulfide.

13. A method as defined in claim 11 wherein said metallic component is molybdenum sulfide.

14. A method as defined in claim 11 wherein said metallic component is tungsten sulfide.

15. A method as defined in claim 11 wherein the porous carrier material is activated carbon.

* * * * *